United States Patent
Yuan et al.

(10) Patent No.: US 10,812,832 B2
(45) Date of Patent: Oct. 20, 2020

(54) EFFICIENT STILL IMAGE CODING WITH VIDEO COMPRESSION TECHNIQUES

(71) Applicant: Apple Inc., Cupertino, CA (US)

(72) Inventors: Hang Yuan, San Jose, CA (US); Chris Y. Chung, Sunnyvale, CA (US); Jae Hoon Kim, San Jose, CA (US); Yeping Su, Sunnyvale, CA (US); Jiefu Zhai, San Jose, CA (US); Xiaosong Zhou, Campbell, CA (US); Hsi-Jung Wu, San Jose, CA (US)

(73) Assignee: APPLE INC., Cupertino, CA (US)

( * ) Notice: Subject to any disclaimer, the term of this patent is extended or adjusted under 35 U.S.C. 154(b) by 1102 days.

(21) Appl. No.: 14/732,393

(22) Filed: Jun. 5, 2015

(65) Prior Publication Data
US 2016/0360231 A1    Dec. 8, 2016

(51) Int. Cl.
*H04N 19/85* (2014.01)
*H04N 19/33* (2014.01)
(Continued)

(52) U.S. Cl.
CPC .............. *H04N 19/85* (2014.11); *H04N 19/33* (2014.11); *H04N 19/503* (2014.11); *H04N 19/88* (2014.11)

(58) Field of Classification Search
CPC ...... H04N 19/61; H04N 19/176; H04N 19/70; H04N 19/46; H04N 19/117; H04N 19/187;
(Continued)

(56) References Cited

U.S. PATENT DOCUMENTS

| 7,379,498 B2 | 5/2008 | Fu et al. |
| 7,746,384 B2 | 6/2010 | Saitou et al. |

(Continued)

*Primary Examiner* — Farhan Mahmud
(74) *Attorney, Agent, or Firm* — BakerHostetler (57) ABSTRACT

Coding techniques for image data may cause a still image to be converted to a "phantom" video sequence, which is coded by motion compensated prediction techniques. Thus, coded video data obtained from the coding operation may include temporal prediction references between frames of the video sequence. Metadata may be generated that identifies allocations of content from the still image to the frames of the video sequence. The coded data and the metadata may be transmitted to another device, whereupon it may be decoded by motion compensated prediction techniques and converted back to a still image data. Other techniques may involve coding an image in both a base layer representation and at least one coded enhancement layer representation. The enhancement layer representation may be coded predictively with reference to the base layer representation. The coded base layer representation may be partitioned into a plurality of individually-transmittable segments and stored. Prediction references of elements of the enhancement layer representation may be confined to segments of the base layer representation that correspond to a location of those elements. Meaning, when a pixel block of an enhancement layer maps to a given segment of the base layer representation, prediction references are confined to that segment and do not reference portions of the base layer representation that may be found in other segment(s).

24 Claims, 6 Drawing Sheets

(51) Int. Cl.
*H04N 19/88* (2014.01)
*H04N 19/503* (2014.01)

(58) Field of Classification Search
CPC .... H04N 19/105; H04N 19/13; H04N 19/593; H04N 19/147; H04N 19/82; H04N 19/172; H04N 19/52; H04N 19/577; H04N 19/17; H04N 19/137; H04N 19/159

See application file for complete search history.

(56) References Cited

U.S. PATENT DOCUMENTS

| | | |
|---|---|---|
| 7,848,416 B2 | 12/2010 | Mori |
| 8,433,183 B2 | 4/2013 | Hidaka et al. |
| 2012/0307904 A1* | 12/2012 | Yi .................... H04N 19/176 375/240.16 |

* cited by examiner

EFFICIENT STILL IMAGE CODING WITH VIDEO COMPRESSION TECHNIQUES

BACKGROUND

The present disclosure relates to coding of still image data.

Modern electronic devices perform image capture and exchange operations in a variety of contexts. As performance of these devices improves, so does the amount of data that is captured and exchanged for such operations. For example, at the time of this writing, electronic cameras for consumer applications capture image data at 8- to 12-megapixels at 24 bit RGB produce a still image at 24- to 36-MByte. As the designs for such camera systems improve, the volume of such data likely will increase.

A variety of coding protocols have been defined for still image data, such as the JPEG standard, the Tagged Image File Format (TIFF) standard and the like. Each protocol exploits spatial redundancies in source image data to achieve bandwidth conservation. Some protocols, like JPEG, are lossy while others, like TIFF, are lossless. None of these still image coding protocols attempt to apply temporal coding techniques to still image data. In still image coding, since only one image captured at a time is coded per coding instance, there are no temporal redundancies to exploit.

The inventors perceive an advantage to be obtained by applying temporal coding techniques to still image data. Accordingly, they have identified a need in the art for a coding system that applies such techniques in the still image context.

DETAILED DESCRIPTION

Embodiments of the present disclosure provide advanced coding techniques for image data in which a still image to be coded is converted to a "phantom" video sequence, which is coded by motion compensated prediction techniques. Thus, coded video data obtained from the coding operation may include temporal prediction references between frames of the video sequence. Metadata may be generated that identifies allocations of content from the still image to the frames of the video sequence. The coded data and the metadata may be transmitted to another device, whereupon it may be decoded by motion compensated prediction techniques and converted back to a still image.

Other techniques may involve coding an image in both a base layer representation and at least one coded enhancement layer representation. The enhancement layer representation may be coded predictively with reference to the base layer representation. The coded base layer representation may be partitioned into a plurality of individually-transmittable segments and stored. Prediction references of elements of the enhancement layer representation may be confined to segments of the base layer representation that correspond to a location of those elements. Meaning, when a pixel block of an enhancement layer maps to a given segment of the base layer representation, prediction references are confined to that segment and do not reference portions of the base layer representation that may be found in other segment(s).

Figure 1:
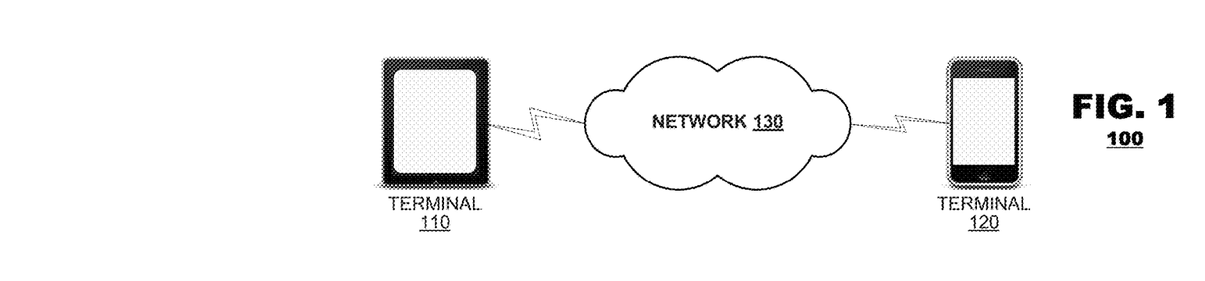
FIG. 1 is a simplified block diagram of an encoder/decoder system according to an embodiment of the present disclosure.

FIG. 1 is a simplified block diagram of an encoder/decoder system 100 according to an embodiment of the present disclosure. The system 100 may include first and second terminals 110, 120 interconnected via a network 130. The terminals 110, 120 may exchange coded video with each other via the network 130, either in a unidirectional or bidirectional exchange. For unidirectional exchange, a first terminal 110 may capture video data from local image content, code it and transmit the coded video data to a second terminal 120. The second terminal 120 may decode the coded video data that it receives and display the decoded video at a local display. For bidirectional exchange, each terminal 110, 120 may capture video data locally, code it and transmit the coded video data to the other terminal. Each terminal 110, 120 also may decode the coded video data that it receives from the other terminal and display it for local viewing.

As discussed hereinbelow, the terminals 110, 120 may include functionality of that supports coding and decoding of a video sequence that constitutes a plurality of frames representing a time-ordered sequence of the video sequence. The terminals 110, 120, for example, may operate according to a predetermined coding protocol such as MPEG-4, H.263, H.264 and/or HEVC. As proposed by the present disclosure, the terminals 110, 120 may include functionality to convert, at an encoding terminal, a still image into a "phantom" video sequence that can be coded according to a governing coding protocol between the terminals 110, 120, to code the video sequence according to that protocol and transmit the coded sequence. At a decoding terminal, the coded sequence may be decoded to yield a recovered version of the phantom video sequence, which may be converted back to a still image. In this manner, the terminals 110, 120 may code a single still image in a manner that benefits from the advantages of temporal prediction.

Although the terminals 110, 120 are illustrated as tablet computers and smartphones, respectively, in FIG. 1, they may be provided as a variety of computing platforms, including servers, personal computers, laptop computers, media players and/or dedicated video conferencing equipment. The network 130 represents any number of networks that convey coded video data among the terminals 110, 120, including, for example, wireline and/or wireless communication networks. A communication network 130 may exchange data in circuit-switched and/or packet-switched channels. Representative networks include telecommunications networks, local area networks, wide area networks and/or the Internet. For the purposes of the present discussion, the architecture and topology of the network 130 is immaterial to the operation of the present disclosure unless discussed hereinbelow.

Figure 2:
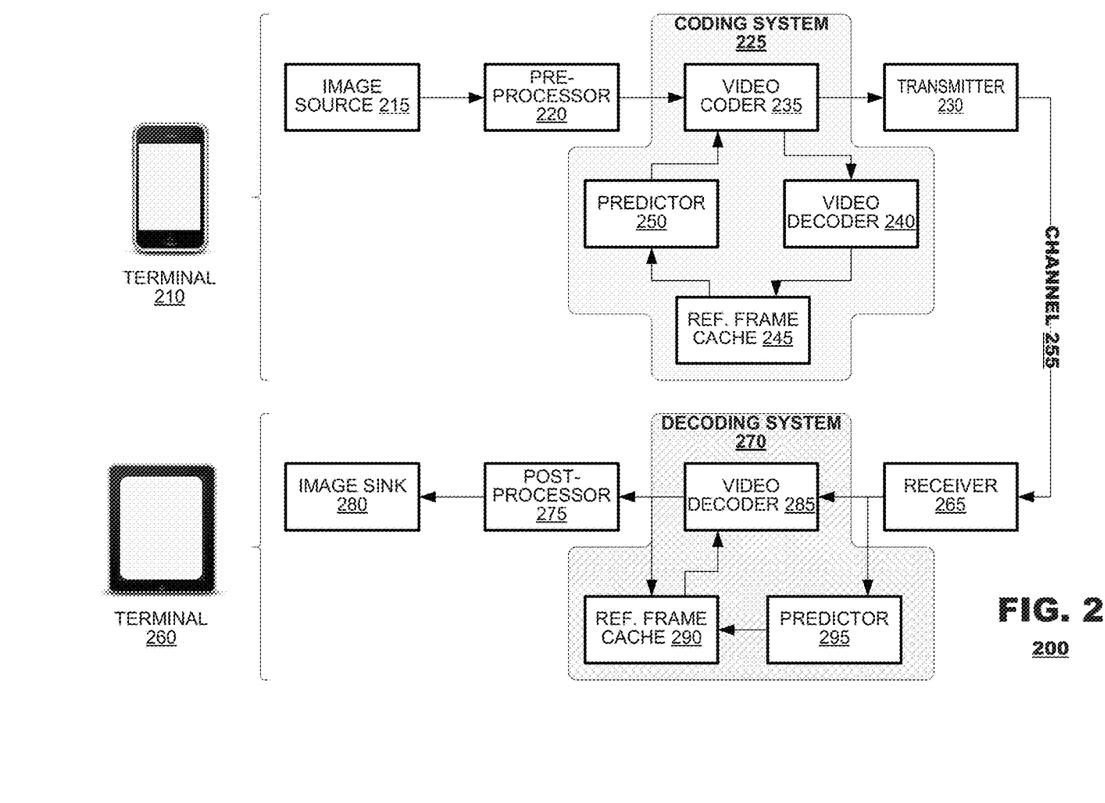
FIG. 2 is a functional block diagram illustrating components of terminals in an encoder/decoder system according to an embodiment of the present disclosure.

FIG. 2 is a functional block diagram illustrating components of terminals 210, 260 in an encoder/decoder system 200 according to an embodiment of the present disclosure. FIG. 2 illustrates functional units of a terminal 210 that perform coding of video and/or still images for delivery to terminal 260. Thus, the terminal 210 may include an image source 215, a pre-processor 220, a coding system 225, and a transmitter 230. The image source 215 may generate either a video sequence or a still image for coding. Typical video sources 215 include electronic cameras that generate a video sequence and/or still images from locally-captured image information and storage devices in which the video sequences and/or still images may be stored. Thus, source video may represent naturally-occurring content or synthetically-generated content (e.g., computer generated content) as application needs warrant. The image source 215 may provide source video and/or still images to other components within the terminal 210.

The coding system 225 may code video sequences according to motion-compensated prediction to reduce bandwidth of the sequences. In an embodiment, the coding system 225 may include a video coder 235, a video decoder 240, a reference frame cache 245 and a predictor 250. The video coder 235 may perform coding operations on an input video sequence to reduce its bandwidth. The video coder 235 may code the video data according to spatial and/or temporal coding techniques, which exploit redundancies in the source video's content. For example, the video coder 235 may use content of one or more previously-coded "reference frames" to predict content for a new input frame that has yet to be coded. The video coder 235 may identify the reference frame(s) as a source of prediction in the coded video data and may provide supplementary "residual" data to improve image quality obtained by the prediction.

Typically, the video coder 235 operates on predetermined coding units, called "pixel blocks" herein. That is, an input frame may be parsed into a plurality of pixel blocks—spatial areas of the frame—and prediction operations may be performed for each such pixel block (or, alternatively, for a collection of pixel blocks). The video coder 235 may operate according to any of a number of different coding protocols, including, for example, MPEG-4, H.263, H.264 and/or HEVC. Each protocol defines its own basis for defining pixel blocks and the principles of the present disclosure may be used cooperatively with these approaches.

The coding system 225 may include a local decoder 240 that generates decoded video data from the coded video that it generates. The video coder 235 may designate various coded frames from the video sequence to serve as reference frames for use in predicting content of other frames. The video decoder 240 may decode coded data of the reference frames and assemble decoded reference frames therefrom, then store the decoded reference frames in the reference frame cache 245. Many predictive coding operations are lossy operations, which cause decoded video data to vary from the source video data in some manner. By decoding the coded reference frames, the coding system 225 may store a copy of the reference frames as they will be recovered by a decoder at the terminal 260.

The terminal 210 may include a pre-processor 220 that may perform processing operations on the source video to condition it for coding by the video coder 235. Typical pre-processing may include filtering operations that alter the spatial and/or temporal complexity of the source video, resizing operations that alter the size of frames within the source video and frame rate conversion operations that alter the frame rate of the source video. Such pre-processing operations may vary dynamically according to operating states of the terminal 210, operating states of the network 130 (FIG. 1) and/or operating states of a second terminal 120 (FIG. 1) that receives coded video from the terminal 210. The pre-processor 220 may output pre-processed video to the video coder 235. In some operating states, the pre-processor 220 may be disabled, in which case, the pre-processor 220 outputs source video to the video coder 235 without alteration.

In an embodiment, for still images, the pre-processor 220 may generate the phantom video sequence from the still image that is to be coded. That is, the pre-processor 220 may apportion content from the still image to a plurality of frames, which would be coded by the coding system 225. Doing so allows the coding system 225 to apply motion-compensation techniques to the phantom video sequence which is likely to reduce its bandwidth.

The transmitter 230 may format the coded video data for transmission to another terminal. Again, the coding protocols typically define a syntax for exchange of video data among the different terminals. Additionally, the transmitter 230 may package the coded video data into packets or other data constructs as may be required by the network. Once the transmitter 230 packages the coded video data appropriately, it may release the coded video data to the network 130 (FIG. 1).

FIG. 2 also illustrates functional units of a second terminal 260 that decodes coded video data according to an embodiment of the present disclosure. The terminal 260 may include a receiver 265, a decoding system 270, a post-processor 275, and an image sink 280. The receiver 265 may receive coded video data from the channel 255 and provide it to the decoding system 270. The decoding system 270 may invert coding operations applied by the first terminal's coding system 225 and may generate recovered video data therefrom. The post-processor 275 may perform signal conditioning operations on the recovered video data from the decoding system 270. The image sink 280 may render the recovered video data.

As indicated, the receiver 265 may receive coded video data from a channel 255. The coded video data may be included with channel data representing other content, such as coded audio data and other metadata. The receiver 265 may parse the channel data into its constituent data streams and may pass the data streams to respective decoders (not shown), including the decoding system 270.

The decoding system 270 may generate recovered video data from the coded video data. The decoding system 270 may include a video decoder 285, reference frame cache 290 and predictor 295. The predictor 295 may respond to data in the coded video that identifies prediction operations applied by the coding system 225 and may cause the reference frame cache 290 to output reference picture data to the video decoder 285. Thus, if the video coder 235 coded an element of a source video sequence with reference to a given element of reference picture data, the video decoder 285 may decode coded data of the source video element with reference to the same reference picture data. The video decoder 285 may output data representing decoded video data to the post-processor 275. Decoded reference frame data also may be stored in the reference picture cache 290 for subsequent decoding operations. The decoding system 270 may perform decoding operations according to the same coding protocol applied by the coding system 225 and may comply with MPEG-4, H.263, H.264 and/or HEVC.

The post-processor 275 may condition recovered frame data for rendering. As part of its operation, the post-processor 275 may perform dynamic range mapping as discussed hereinbelow. Optionally, the post-processor 275 may perform other filtering operations to improve image quality of the recovered video data.

In an embodiment, for still images, the post-processor 275 may generate still image data from a phantom video sequence that is output by the decoding system 270. That is, the post-processor 275 may reassemble content for the still image from the frames of the phantom video sequence.

The image sink 280 represents units within the second terminal 260 that may consume recovered video data and/or still image data. In an embodiment, the image sink 280 may be a display device or a storage device. In other embodiments, however, the image sink 280 may be provided by applications that execute on the second terminal 260 that consume video data. Such applications may include, for example, video games and video authoring applications (e.g., editors).

FIG. 2 illustrates functional units that may be provided to support unidirectional transmission of video and/or still images from a first terminal 210 to a second terminal 260. In many video coding applications, bidirectional transmission of video and/or still images may be warranted. The principles of the present disclosure may accommodate such applications by replicating the functional units 215-250 within the second terminal 260 and replicating the functional units 265-295 within the first terminal 210. Such functional units are not illustrated in FIG. 2 for convenience.

Figure 3:
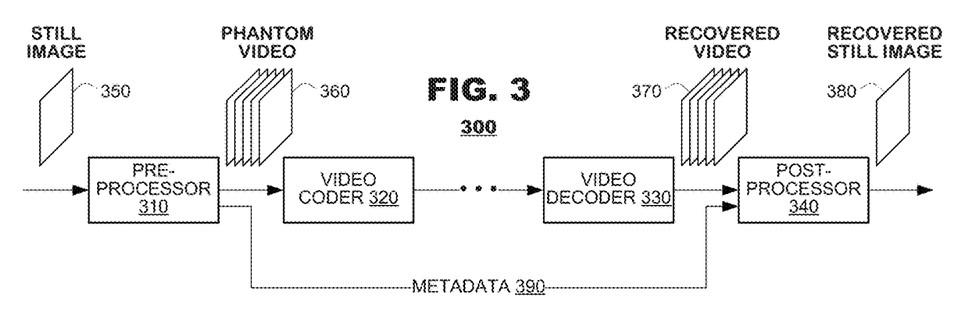
FIG. 3 figuratively illustrates conversion of a still image to a phantom video sequence and back, according to an embodiment of the present disclosure.

FIG. 3 figuratively illustrates conversion 300 of a still image to a phantom video sequence and back, according to an embodiment of the present disclosure. As illustrated, a pre-processor 310 may receive a still image 350 and convert it to the phantom video sequence 360. For example, a 3264×2448 pixel (width×height) still image can be converted into phantom video sequence of four 1632×1224 frames. The pre-processor 310 may generate the frames of the phantom video sequence in a format that is expected by the video coder 320. The video coder 320 may code the phantom video sequence according to the protocol to which the video coder 320 conforms.

The video decoder 330 may decode the coded video and recover video frames 370 therefrom. Depending on the type of coding and decoding that is used, coding losses may be incurred, and the recovered video may represent the phantom video sequence but with some errors. The post-processor 340 may convert the recovered video sequence into a still image 380 by inversion of the conversion that was performed by the pre-processor 310.

In one embodiment, the pre-processor 310 may convert content of the still image to the phantom video sequence according to a default allocation protocol. The pre-processor 310 may perform a preliminary analysis of the still image 350 to determine, for example, its size and the size of frames that the video coder 320 is adapted to process. The pre-processor 310 may determine a number of frames that should be included in the phantom video sequence 360 and their size (if, for example, the video coder 320 is capable of processing a limited variety of frame sizes). The pre-processor 310 may allocate image content of the still image 350 to the phantom video sequence 360 according to a default allocation scheme. In one embodiment, for example, the pre-processor 310 may parse the still image into a plurality of equally-sized pixel blocks and allocate the pixel blocks to frames of the phantom video sequence 360 according to a predetermined allocation scheme, such a round robin scheme or a column-based or row-based de-interleaving scheme. In such an embodiment, the pre-processor 310 may generate metadata that identifies the size of the still image 350 and the number of frames in the phantom video 360. The allocation of pixel blocks, however, need not be communicated expressly, however, because the post-processor 340 may be programmed according to the default allocation scheme.

In another embodiment, allocation of content from the still image 350 to the frames of the phantom video 360 may be done adaptively. In this case, the pre-processor 310 may generate data identifying a mapping of the still image's content to the frames of phantom video 360. This mapping may be communicated to the post-processor 340 in metadata.

Metadata may be communicated by the pre-processor 310 to the post-processor 340 in a metadata channel 390 of the coded video data. Many coding protocols allocate bandwidth to permit terminals to exchange data that does not have predetermined meaning under the protocol. For example, the H.264 coding protocol defines a Supplemental Enhancement Information ("SEI") message for such purposes. Metadata may be communicated in such messages. For coding protocols that do not reserve bandwidth for such purposes, metadata communication may occur between terminals in a channel that falls outside the syntax occupied by coded video data (e.g., a separate communication channel between the terminals).

It is expected that operation of the embodiment illustrated in FIG. 3 may achieve compression efficiencies that otherwise might not be achieved by video coders for still images. Video coders typically achieve compression efficiencies by exploiting temporal redundancy in a video sequence—redundancies that exist between frames of the sequence. A video that contains a broad expanse of sky within its image content, for example, may not exhibit much frame-to-frame variations in a region occupied by the sky. A video coder may achieve compression efficiency by coding a first frame by an intra-coding mode then coding the other frames by inter-coding, which exploits redundancy between the first frame and other frames.

Operation of the embodiment of FIG. 3 is expected to achieve compression efficiency by generating a phantom video sequence from the still image that has temporal redundancy. Having allocated content of the still image 350 to a phantom video sequence 360, the first frame of the phantom video sequence 360 need be coded as an intra-coded frame. The first frame of the sequence likely will be smaller than the source still image 350, so it likely will have a smaller bit "cost." Other frames in the phantom video sequence 360 may be coded by inter-coding, which is a less expensive form of coding than intra-coding. Thus, coding of the still image 350 in the manner illustrated in FIG. 3 may achieve efficiencies as compared to a system that codes the still image as a single frame.

In an embodiment, the frames of the phantom video 360 may represent the still image 350 at different resolution levels. The first frame may have the lowest spatial resolution and may be intra-coded; each later frame may have an incrementally higher resolution than the previous one and may be inter-coded. For each frame, either single-layer representation or a scalable representation (e.g., base layer and enhancement layer coding) may be used.

In a further embodiment, a pre-processor 310 may apply different scalers for down-scaling and up-scaling of image data. By applying a down-scaler with a low cut-off frequency and a flat passband, the pre-processor 310 may generate low resolution frames that have reduced noise level and are easier to compress. During encoding, a video coder 320 may reduce quantization parameters (QPs) for low resolution frames which lead to relatively higher coding quality. From the low-noise and high-quality low-resolution frames, the pre-processor 310 may apply an up-scaler with relatively higher cutoff frequency without the risk of amplifying the noise.

In another embodiment, a pre-processor may divide the image into tiles first before encoding. Each tile is represented as a separate frame and can therefore be independently decoded. Indeed, tiling and multi-resolution representation can be employed cooperatively. In this case, each image may be represented first as multiple frames with different resolutions and then each frame may be divided further into tiles. Prediction of inter-coded tiles may be restricted within the collocated tiles in previous frames.

A video coder 320 may calculate automatically an optimal quantization parameter (QP) value for each pixel block within a still image to achieve maximum compression without incurring perceptible quality loss. The video coder 320 may operate according to a joint classification-based and measure-based approach. Human perception of quality loss often is related to brightness level, spatial complexity and edge structures within source image data. In the classification-based approach, the video coder 320 may measure the visual significance of such characteristics within the pixel blocks to be coded and may categorize each pixel block into one of the low-loss, medium-loss or high-loss categories based on such measurements. The video coder 320 may assign a quantization parameter to the pixel blocks based on such classifications.

In the measure-based approach, a video coder 320 may combine the measures of brightness, complexity and edges to obtain an aggregate visual significance measure, which often maps well to human sensitivity to image content in the pixel block. The video coder 320 may map the measure to a QP value.

A video coder's visual significance measure may involve a calculation of brightness, smoothness, variance, edge strength and orientation of the pixel block based on variance and gradient information. Furthermore, it may depend on the brightness, smoothness and edge strength of the neighboring pixel blocks. A video coder 320 may combine these metrics to develop a description of the structures and content of different regions within an image. The video coder 320 thus may estimate human sensitivity to the local content and decide the final QP values for each pixel block.

Figure 4:
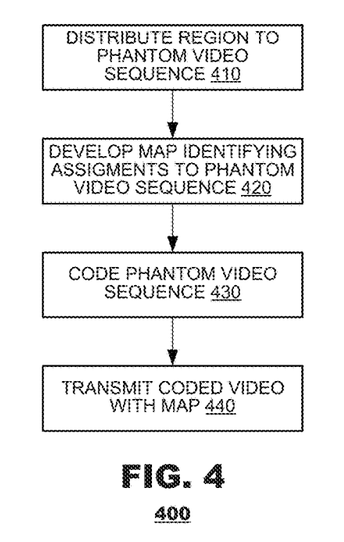
FIG. 4 illustrates a method according to an embodiment of the present disclosure.

FIG. 4 illustrates a method 400 according to an embodiment of the present disclosure. An image with an expanse of sky as discussed in the foregoing example may have relatively high correlation. The method 400 may distribute content of the region to multiple frames in the phantom video sequence (box 410). The operation of box 410 may generate temporal correlation among image content of the phantom region. The method 400 also may develop a map that identifies assignments of the region among the phantom video sequence (box 420). Thereafter, the method 400 may cause the phantom video sequence to be coded (box 430) and transmitted along with the map developed in box 420 (box 440).

Figure 5:
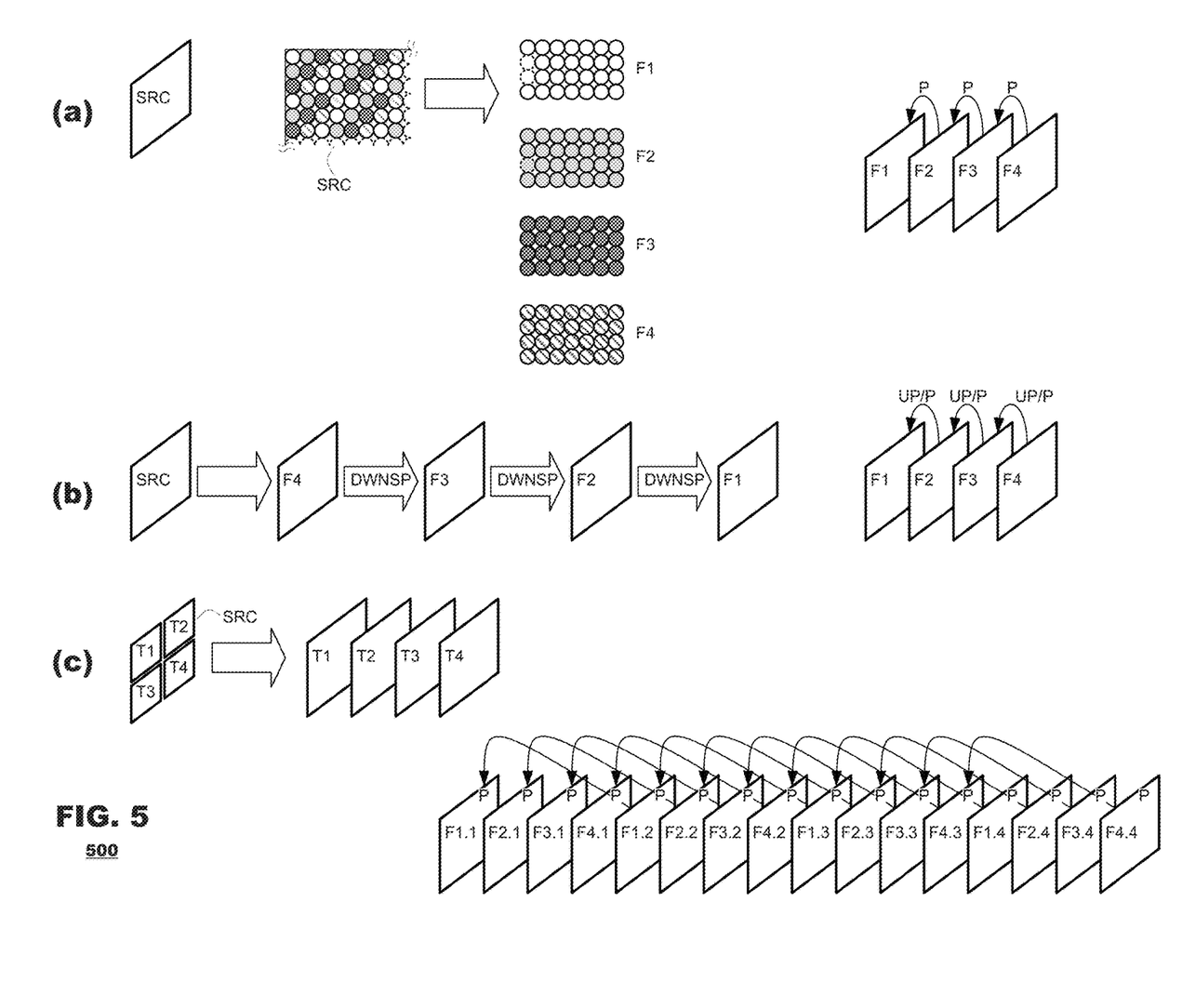
FIG. 5 illustrates exemplary techniques of distributing content of a source frame to frames of the phantom video sequence.

FIG. 5 illustrates exemplary techniques of distributing content of a source frame to frames of the phantom video sequence. In the example of FIG. 5(*a*), a video sequence of four frames F1-F4 of a common size may be generated from a source frame SRC. Individual pixels of the source frame may be distributed among the four frames according to a predetermined distribution pattern. Thus, any spatial correlations among the pixels of the SRC frame are likely to be recognized as temporal correlation when the four frames F1-F4 are coded by the video coder 235 (FIG. 2).

FIG. 5(*b*) illustrates another distribution technique in which a source frame SRC generates four frames F1-F4 of different sizes. Here, the frame 1 is a smallest sized frame, frame F2 is the next largest-sized frames, frame F3 is another larger sized frame and F4 is the largest frame, which may have the same size as the source frame SRC. FIG. 5(*b*) illustrates that the four frames F1-F3 are generated by downsampling the source frame SRC. Downsampling may occur as a cascaded application of downsampling filters as illustrated in FIG. 5(*b*) or it may occur as a parallel application of downsampling filters of different strengths, each using the source frame SRC as an input to the filter. The frames F1-F4 may be of arbitrary size, as may be convenient for the application in which the embodiments are being used.

Once the four frames F1-F4 of different sizes are generated, they may form a prediction chain between them. In this example, the frame F1 may be coded as an intra-coded frame, and the frames F2-F3 may be coded using their neighbor frames as a source of prediction. Thus, a decoded version of the I-coded frame F1 would be upsampled and used as a prediction reference for frame F2. Similarly, a decoded version of the P-coded frame F2 would be upsampled and used as a prediction reference for frame F3. And, a decoded version of the P-coded frame F3 would be upsampled and used as a prediction reference for frame F4. This operation may continue for as many frames as are present in the phantom video sequence.

In an embodiment, video coders 320 and decoders 330 (FIG. 3) may use different scalers for down- and up-scaling. By applying a down-scaler with a low cut-off frequency and a flat passband, low resolution frames may be generated that have reduced noise levels and are easier to compress. During encoding the video coder 320 may use reduced the QPs for low resolution frames as compared to high resolution frames to improve coding quality. From the low-noise and high-quality low-resolution frames, a decoder 330 may employ an up-scaler with relatively higher cut-off frequency without the risk of amplifying the noise. Coded video data may include fields to identify the resolution and, if used, the scalers used for downsampling for the input frame.

FIG. 5(*c*) illustrates a further distribution technique in which a source frame SRC is parsed first into tiles T1-T4 and the tiles T1-T4 are coded as phantom video sequences. Dividing images into tiles may facilitate fast access and/or random access to different spatial areas of an image. In the example of FIG. 5(*c*), the tiles T1-T4 correspond to respective quadrants of the source frame SRC. Each tile T1, T2, T3 and T4 may be converted to respective frames in a phantom video sequence. Thus, tile T1 may be converted to frames F1.1, F1.2, F1.3 and F1.4. Similarly, the other tiles may be converted to respective frames (e.g., the T2 may be converted to frames F2.1, F2.2, F2.3 and F2.4, etc.). The phantom video sequence may be coded using temporal prediction techniques. The principles of FIG. 5(*c*) may be used cooperatively with the techniques illustrated in FIGS. 5(*a*) and 5(*b*).

According to another embodiment of the present disclosure, image data may be coded according to scalability as a base layer representation and one or more enhancement layer representations.

Figure 6:
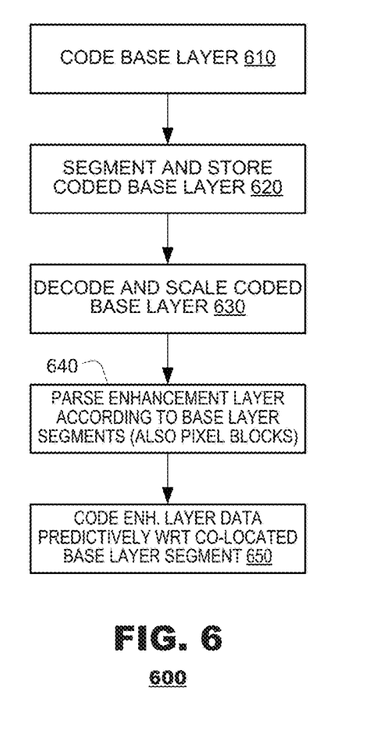
FIG. 6 illustrates a method according to another embodiment of the present disclosure.

FIG. 6 illustrates a method 600 according to another embodiment of the present disclosure. According to the method, an image may be coded as a base layer representation (box 610). The coded base layer may represent the source image data at a coarse level of coding, for example, having been spatially downsampled to reduce its size. The downsampled image may have been parsed for coding as pixel blocks according to a governing coding protocol. Thereafter, the coded base layer data may be segmented for storage at a media server (box 620). Segmentation may parse the coded base layer data into individually accessible data units which may be delivered by a server to a client device. Typically, the segmented coded base layer data will include multiple coded pixel blocks; but this need not always occur.

The image also may be coded as one or more enhancement layer representations. In the simplest example, the source image may be coded as a single enhancement layer. In this embodiment, the coded base layer data may be decoded and scaled (box 630) for use as prediction references of the enhancement layer data. The decoded base layer data may be spatially scaled to match a size of the enhancement layer data being coded. Thereafter, the enhancement layer data may be parsed into pixel blocks according to segments of the scaled base layer data (box 640) and also according to the coding protocol that will be used for coding. The enhancement layer data may be coded predictively with respect to the scaled base layer data (box 650). As the enhancement layer data is coded, prediction references may be constrained to fall within base layer segments in which the pixel blocks reside.

If an image is to be coded in multiple enhancement layers, the operations of boxes 630-650 may be repeated with some modification (steps not shown). Typically, a first enhancement layer will represent the source image at a first size, and a second enhancement layer will represent the source image at a second size larger than the first. Coding of the first enhancement layer may occur as discussed above. Coding of the second enhancement layer may occur by decoding the coded base layer data and the coded first enhancement layer data jointly (a modification of box 630). The resultant data may be scaled to match a size of the second enhancement layer data. The second enhancement layer data may be parsed according to the segments of the base layer data, scaled to match a size of the second enhancement layer data (a modification of box 640). Thereafter, the second enhancement layer data may be coded predictively with reference to the decoded base layer/first enhancement layer data (a modification to box 650). As with coding of the first enhancement layer, prediction references may be constrained to fall within base layer segments in which the pixel blocks reside. This operation may repeat for as many enhancement layer representations of an image as are desired to code.

Figure 7:
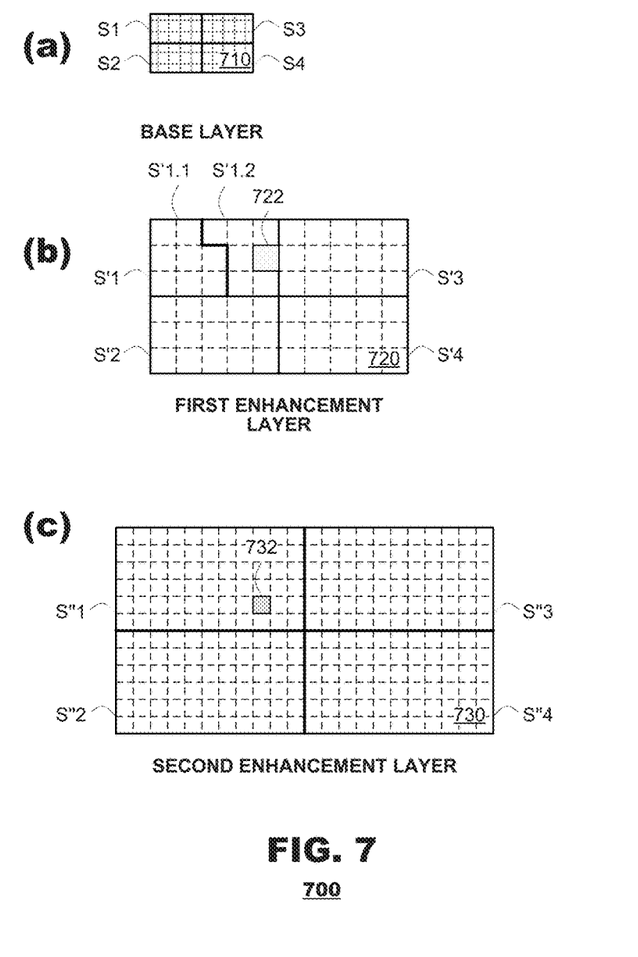
FIG. 7 illustrates exemplary image data that may be processed by the method of FIG. 6.

FIG. 7(a) illustrates exemplary image data 700 that may be processed by the method 600 of FIG. 6. As illustrated, an image may be represented by a base layer representation 710 at a first size, a first enhancement layer representation 720 at a larger size and a second enhancement layer representation 730 at yet another larger size. In this example, when the base layer representation 710 is coded, coded base layer data may be stored as four segments S1-S4. The segments may be stored by a media server for individual delivery to a client device upon request.

As shown in FIG. 7(b), the spatial areas occupied by the base layer segments S1-S4 map to the regions S'1-S'4 in the first enhancement layer representation 720. As discussed, prediction references for the pixel block of each region S'1, S'2, S'3 and S'4 may be constrained to the respective regions S1, S2, S3 and S4 of the base layer representation 720. Thus, a pixel block 722, which appears in region S'1 of the first enhancement layer representation 720, may find its prediction reference only in region S1 of the base layer representation 710. Base layer data from region S2 would not be used as a prediction reference even if it otherwise would provide a good prediction for the pixel block 722.

As shown in FIG. 7(c), the spatial areas occupied by the base layer segments S1-S4 map to the regions S"1-S"4 in the second enhancement layer representation 730. As discussed, prediction references for the pixel block of each region S"1, S"2, S"3 and S"4 may be constrained to the respective regions S'1, S'2, S'3 and S'4 of the first enhancement layer representation 720, which map respectively to regions S1, S2, S3 and S4 of the base layer representation 720. Thus, a pixel block 732, which appears in region S"1 of the second enhancement layer representation 720, may find its prediction reference only in region S'1 of the first enhancement layer representation 720. Enhancement layer data from region S'2 would not be used as a prediction reference even if it otherwise would provide a good prediction for the pixel block 732.

Optionally, coded enhancement layer data also may be segmented for storage. Coded enhancement layer segments may be defined to match the coded segments of the base layer representation 710 to which they are mapped (e.g., storage segments may be defined around segments S'1, S'2, S'3 and S'4 for the first enhancement layer representation 720). If desired, further segmentation may be performed, working from the segment definitions that correspond to the base layer segmentation. FIG. 7(b), for example, illustrates an example in which region S'1 is parsed further into segments S'1.1 and S'1.2. In such an embodiment, prediction references for pixel blocks in the second enhancement layer 730 may be constrained based on the pixel block's relationship to these segments S'1.1 and S'1.2 in the first enhancement layer 720.

In other embodiments of the present invention, a video coder 320 may automatically calculate optimal QP values for each pixel block within a still image so that maximum compression can be achieved without incurring perceptible quality loss.

Figure 8:
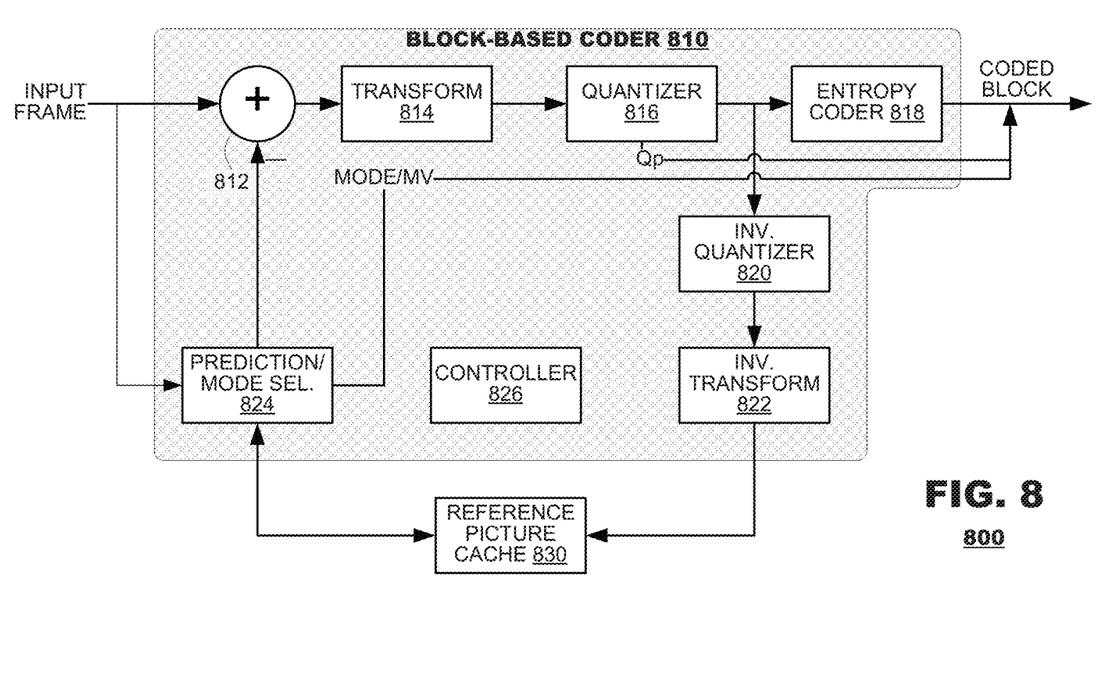
FIG. 8 is a simplified block diagram of a video coder according to an embodiment of the present disclosure.

FIG. 8 is a simplified block diagram of a video coder 800 according to an embodiment of the present disclosure. An input frame to be coded, such as the frames of the phantom video sequences described herein, may by parsed into pixel blocks and coded on a pixel block-by-pixel block basis. FIG. 8 illustrates a block-based coder 810, which may code the pixel blocks from the input frame, and a reference picture cache 830. The block-based coder 810 may include a subtractor 812, a transform unit 814, a quantizer 816, an entropy coder 818, an inverse quantizer 820, an inverse transform unit 822, a prediction/mode selection unit 824, and a controller 826.

The subtractor 812 may perform a pixel-by-pixel subtraction between pixel values in the input frame and any pixel values that are provided to the subtractor 812 by the prediction/mode selection unit 824. The subtractor 812 may output residual values representing results of the subtraction on a pixel-by-pixel basis. In some cases, the prediction/mode selection unit 824 may provide no data to the subtractor 812 in which case the subtractor 812 may output the source pixel values without alteration.

The transform unit 814 may apply a transform to a pixel block of input data, which converts the pixel block to an array of transform coefficients. Exemplary transforms may include discrete cosine transforms and wavelet transforms. The transform unit 814 may output transform coefficients for each pixel block to the quantizer 816.

The quantizer 816 may apply a quantization parameter Qp to the transform coefficients output by the transform unit 814. The quantization parameter Qp may represent an array of values, each value being applied to a respective transform coefficient in the pixel block. The quantizer 816 may output quantized transform coefficients to the entropy coder 818.

The entropy coder 818, as its name applies, may perform entropy coding of the quantized transform coefficients presented to it. The entropy coder 818 may output a serial data stream, typically run-length coded data, representing the quantized transform coefficients. Typical entropy coding schemes include variable length coding and arithmetic coding. The entropy coded data may be output from the block-based coder 810 as coded data of the pixel block. Thereafter, it may be merged with other data such as coded data from other pixel blocks and coded audio data and be output to a channel (not shown).

The block-based coder 810 may include a local decoder formed of the inverse quantizer unit 820, inverse transform unit 822, and an adder (not shown) that reconstruct the coded frames so they may serve as "reference frames" for other input frames. Reference frames are frames that are selected as a candidate for prediction of other frames in the video sequence.

The inverse quantizer unit 820 may perform processing operations that invert coding operations performed by the quantizer 816. Thus, the transform coefficients that were divided down by a respective quantization parameter may be scaled by the same quantization parameter. Quantization often is a lossy process, however, and therefore the scaled coefficient values that are output by the inverse quantizer unit 820 oftentimes will not be identical to the coefficient values that were input to the quantizer 816.

The inverse transform unit 822 may invert transformation processes that were applied by the transform unit 814. Again, the inverse transform unit 822 may apply discrete cosine transforms or wavelet transforms to match those applied by the transform unit 814. The inverse transform unit may generate pixel values, which approximate prediction residuals input to the transform unit 814.

Although not shown in FIG. 8, the block-based coder 810 may include an adder to add predicted pixel data to the decoded residuals output by the inverse transform unit 822 on a pixel-by-pixel basis. The adder may output reconstructed image data of the pixel block. The reconstructed pixel block may be assembled with reconstructed pixel blocks for other areas of the frame and stored in the reference picture cache 830.

The prediction unit 824 may perform mode selection and prediction operations for the input pixel block. In doing so, the prediction unit 824 may select a coding mode representing a type of coding to be applied to the pixel block, for example intra-prediction or inter-prediction. For inter prediction, the prediction unit 824 may perform a prediction search to identify, from a reference picture stored in the reference picture cache 830, stored data to serve as a prediction reference for the input pixel block. The prediction unit 824 may generate identifiers of the prediction reference by providing motion vectors or other metadata for the prediction. The motion vector may be output from the block-based coder 810 along with other data representing the coded block. For intra-prediction, the prediction unit 824 may use a decoded pixel block from the input frame (one that was coded previously) as a source of prediction for the current block. In this case, the prediction unit 824 may supply the decoded intra block to the subtractor 812 as prediction data. The prediction unit 824 outputs a mode identifier representing the coding mode that is applied to the input frame.

When coding frames of the phantom video sequence, a block-based encoder 810 typically will choose the most efficient coding mode from the modes that are available. When coding a frame by intra-coding the only coding modes available to the block-based encoder 810 are spatial prediction modes (the only eligible prediction references are previously coded blocks from the same input frame). When coding a frame by inter-coding, both spatial prediction modes and temporal prediction modes are available. Thus, it is possible in some cases that the block-based encoder 810 will choose to code certain pixel blocks as intra-coded blocks, even though the pixel block is part of an inter-coded frame.

As indicated, a video coder 800 may calculate optimal quantization parameter values for each pixel block within a still image so that maximum compression can be achieved without incurring perceptible quality loss. More specifically, quantization parameters may be selected according to a classification-based approach and a measure-based approach.

Human perception of quality loss is related to brightness level, spatial complexity and edge structures. In the classification-based approach, the video coder 800 may measure the visual significance of each pixel block according to these three factors and assign the pixel block into one of a predetermined number of categories, such as low-loss, medium loss or high loss. Each category may have a range of acceptable QP values assigned to it from prior experimentation.

In the measure-based approach, the video coder 800 may combine the measures of brightness, complexity and edges to obtain an aggregate visual significance measure, which represents human sensitivity to the content in the pixel block. This measure also may be mapped to QP value through a pre-defined table obtained from experiments.

The derivation of visual significance may involve the calculation of brightness, smoothness, variance and edge strength and orientation of the pixel block based on variance and gradient information. Furthermore, it depends on the brightness, smoothness and edge strength of the neighboring pixel blocks. By combining these metrics, the video coder 800 may obtain descriptions of the structures and content of different regions within the input frame. The video coder 800 then use the information to measure human sensitivity to the local content and decide the final QP values for each pixel block.

In cases where sharp edges exist in chroma components but not in luma components, it is beneficial to reduce the chroma QP value but not the luma one. In another embodiment of the invention, it may be useful to represent QP reduction separately. Accordingly, the syntax for a pixel block may be altered to include such a field. For example, in the H.264 coding protocol, in the macroblock_layer( )"chroma_mb_qp_delta" field may be inserted after "mb_qp_delta" to represent a reduced chroma QP value.

In another embodiment, a video coder 800 may choose adaptively the quantization matrices (QMs) and dead-zone settings for each tile based on its content. This can work cooperatively with the adaptation of QP values for each block within a tile and provide highly adaptive quality control in still image compression.

The coder's adaptation scheme may examine content of different image tiles and extract a set of useful statistics. Then, it may calculate a set of quantization matrices for different transform sizes. This calculation may be performed jointly with the adaptation of QP values within the image tile. In particular, some tiles are assigned with a rather flat QM but a large range of QP values; in contrast, others benefit more from an aggressive QM but a smaller QP range.

The choice of QMs mainly depends on three factors: visual significance of textures, edge structures and QP levels. The video coder 800 also may consider neighborhood masking effects in selecting the tolerance of each tile towards the loss of high frequency coefficients, in turn deciding the final QMs.

In applications that require very high or perceptually lossless image quality, the choice of dead-zone settings determines to the final quality and compression efficiency. Specifically, some content requires a smaller dead-zone in quantization, while other can tolerate larger ones. The video coder's 800 final decision of dead-zone settings may be conducted based on the content as well as the choices of QMs and QPs in each image tile. More specifically, different deadzone reduction levels may be chosen based on 1) noise level; 2) smoothness and brightness of the tile; 3) flatness of the QMs; 4) QP levels.

The joint optimization of QPs, QMs and dead-zones for each image tile may provide significant file size saving without loss of visual quality.

Figure 9:
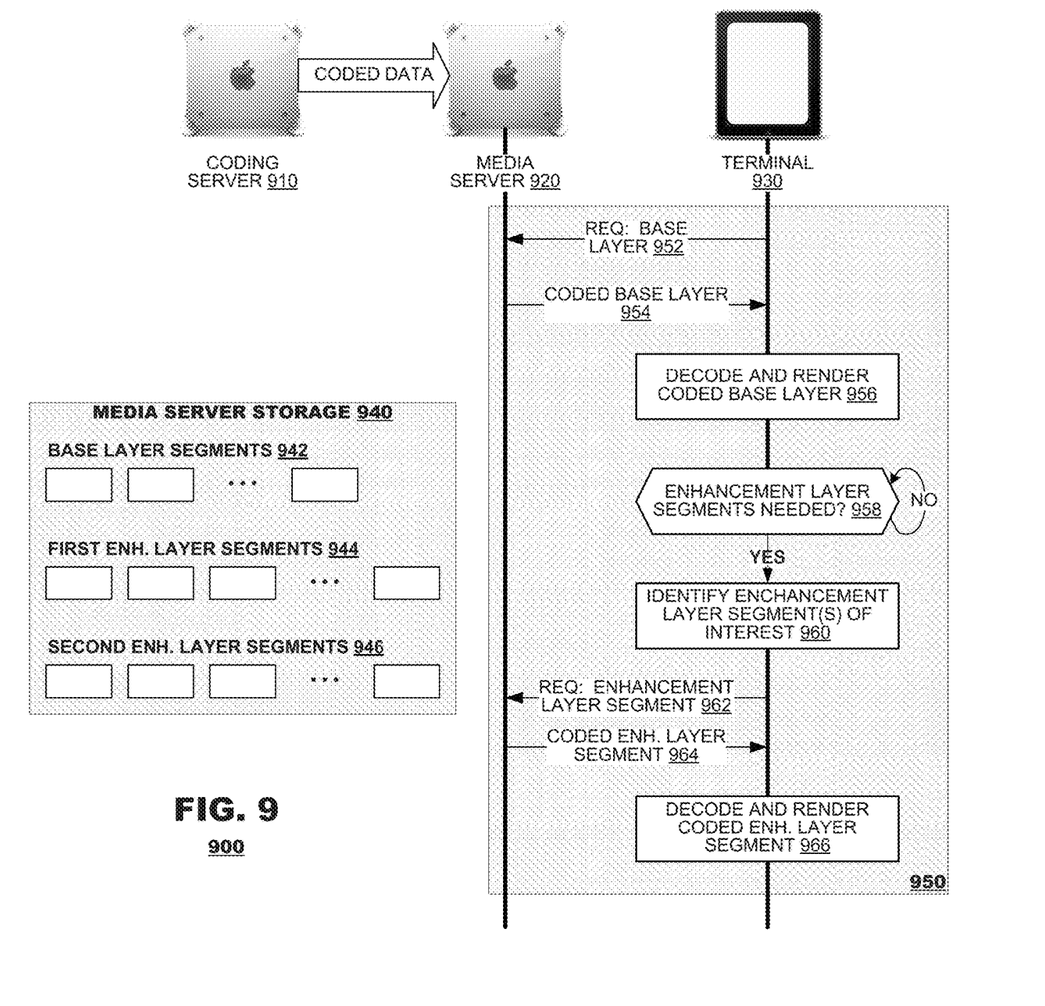
FIG. 9 illustrates a media distribution system and method according to another embodiment of the present disclosure.

FIG. 9 illustrates a media distribution system 900 and method according to another embodiment of the present disclosure. The system 900 may include a coding server 910, a media sever 920 and a terminal 930. The coding server 910 may code image data according to any of the embodiments discussed hereinabove and may provide the coded data to the media sever 920 for storage and delivery. The media server 920 may store the coded data for delivery to a terminal 930 upon request. The terminal 930 may decode and render coded video.

In an embodiment where the coding server 910 operates as discussed in FIG. 6, the coding server 910 may supply segments of coded image data, both base layer segments and coded enhancement layer segments, to the media server 920. FIG. 9 illustrates exemplary coded video data that may reside in media server storage 940 that includes base layer segments 942, first enhancement layer segments 944 and second enhancement layer segments 946.

FIG. 9 also illustrates a method 950 of operation between the media server 920 and the terminal 930 for delivery of coded video. The method 950 may begin with the terminal 930 issuing a request for coded video data (msg. 952). In the example of FIG. 9, the request 952 may be directed to coded base layer data. In response, the media sever 920 may supply the requested video data (msg. 954). The terminal 930 may code and render the coded base layer data (box 956).

Thereafter, the terminal 930 may determine that it needs enhancement layer segments associated with the image being rendered (box 958). For example, the terminal 930 may receive a user command to zoom in on a selected region of the image or to output the image to another device (such as a connected monitor or printer). In either event, the terminal 930 may identify which enhancement layer(s) and which segments of the enhancement layers are needed (box 960). The terminal 930 may issue a request to the media server 920 for the identified segments (msg. 962). The media server 920 may supply the requested video data (msg. 964) including coded enhancement layer segment, where it may be decoded and rendered by the terminal 930 (box 966).

Operation of the method 950 of FIG. 9 is expected to reduce message flows between a media server 920 and a terminal 930 by causing the terminal 930 to request only the segments that are necessary to be rendered by invoking operations (e.g., zoom, print, etc.). Moreover, such operations likely will conserve memory resources at the terminal 930 by avoiding decode and storage of segments that are not necessary for rendering. For image data of large size (e.g., 10 MB or more) such resource conservation can significantly improve the operating state of limited resource terminals, such as smart phones, tablet computers and the like.

The foregoing discussion has described operation of the embodiments of the present disclosure in the context of terminals that embody encoders and/or decoders. Commonly, these components are provided as electronic devices. They can be embodied in integrated circuits, such as application specific integrated circuits, field programmable gate arrays and/or digital signal processors. Alternatively, they can be embodied in computer programs that execute on personal computers, notebook computers, tablet computers, smartphones or computer servers. Such computer programs typically are stored in physical storage media such as electronic-, magnetic- and/or optically-based storage devices, where they are read to a processor under control of an operating system and executed. Similarly, decoders can be embodied in integrated circuits, such as application specific integrated circuits, field programmable gate arrays and/or digital signal processors, or they can be embodied in computer programs that are stored by and executed on personal computers, notebook computers, tablet computers, smartphones or computer servers. Decoders commonly are packaged in consumer electronics devices, such as gaming systems, DVD players, portable media players and the like; and they also can be packaged in consumer software applications such as video games, browser-based media players and the like. And, of course, these components may be provided as hybrid systems that distribute functionality across dedicated hardware components and programmed general-purpose processors, as desired.

Several embodiments of the disclosure are specifically illustrated and/or described herein. However, it will be appreciated that modifications and variations of the disclosure are covered by the above teachings and within the purview of the appended claims without departing from the spirit and intended scope of the disclosure.

We claim:

1. A coding method, comprising:
converting a single still image to be coded to a video sequence;
coding the video sequence by motion compensated prediction that includes temporal prediction references between frames of the video sequence;
generating metadata identifying allocations of content from the still image to the frames of the video sequence; and
transmitting coded data of the video sequence and the metadata to a channel.

2. The method of claim 1, wherein the converting includes transforming spatial correlation among the content of the still image to temporal correlation between frames of the video sequence.

3. The method of claim 1, wherein sizes of the frames of the video sequence increase incrementally through at least a portion of the video sequence.

4. The method of claim 1, wherein the converting comprises assigning pixel blocks of the still image to frames of the video sequence.

5. The method of claim 1, wherein the converting comprises partitioning the image into tiles and allocating pixel blocks of different tiles to different frames of the video sequence.

6. The method of claim 1, wherein the converting comprises:
identifying regions of spatial correlation within the still image, and
distributing pixel blocks of each region among the frames.

7. The method of claim 1, wherein a first frame of the video sequence is coded by intra-coding and other frames of the video sequence are coded by inter-coding.

8. The method of claim 1, wherein the frames of the video sequence have smaller spatial sizes than a size of the still image.

9. The method of claim 1, wherein coding comprises quantizing an intermediate coded representation of a pixel block by a quantization parameter, which is selected from an analysis of brightness level, spatial complexity and edge structures within and around the pixel block.

10. The method of claim 1, wherein coding comprises quantizing an intermediate coded representation of a frame by a quantization parameter, which is selected based on a classification of a pixel block as one of a low-loss, medium-loss or high-loss category.

11. An image coder comprising:
a pre-processor to convert a single still image to be coded to a video sequence and to generate metadata representing the conversion from the still image to the video sequence;
a motion compensated prediction-based video coder that receives the video sequence from the pre-processor and outputs coded video data having temporal prediction references between frames of the video sequence; and
a transmitter to transmit coded data of the video sequence and the metadata to a channel.

12. The coder of claim 11, wherein the pre-processor's conversion includes transforming spatial correlation among content of the still image to temporal correlation between frames of the video sequence.

13. The coder of claim 11, wherein the conversion assigns pixel blocks of the still image to frames of the video sequence.

14. The coder of claim 11, wherein the conversion identifies regions of spatial correlation within the still image and distributes pixel blocks of each region among the frames.

15. The coder of claim 11, wherein video coder codes a first frame of the video sequence by intra-coding and other frames of the video sequence by inter-coding.

16. A non-transitory computer readable medium storing program instructions that, when executed by a processing device, causes the device to:
convert a single still image to be coded to a video sequence;
code the video sequence by motion compensated prediction that includes temporal prediction references between frames of the video sequence;
generate metadata identifying allocations of content from the still image to the frames of the video sequence; and
transmit coded data of the video sequence and the metadata to a channel.

17. A decoding method, comprising:
decoding a coded video sequence by motion compensated prediction that includes temporal prediction references between frames of the video sequence, and
responsive to metadata, received in a channel with the coded video sequence, converting the decoded video sequence to a single still image.

18. The method of claim 17, wherein the converting transforms temporal correlation between frames of the decoded video sequence to spatial correlation among the content of the still image.

19. The method of claim 17, wherein the converting comprises assigning pixel blocks of the frames of the video sequence to the still image.

20. The method of claim 17, wherein a first frame of the coded video sequence is decoded by intra-coding and other frames of the video sequence are decoded by inter-coding.

21. An image decoder, comprising:
a motion compensated prediction-based video decoder that receives a coded video sequence having temporal prediction references between frames of a video sequence and outputs a decoded video sequence therefrom; and
a post-processor to convert the decoded video sequence to a single still image in response to metadata received in a channel with the coded video sequence.

22. The decoder of claim 21, wherein the post-processor transforms temporal correlation between frames of the decoded video sequence to spatial correlation among the content of the still image.

23. The decoder of claim 21, wherein the post-processor assigns pixel blocks of the frames of the video sequence to the still image.

24. The decoder of claim 21, wherein a first frame of the coded video sequence is decoded by intra-coding and other frames of the video sequence are decoded by inter-coding.

* * * * *